Oct. 18, 1960

J. GLASER ET AL 2,956,502

FUEL PUMP

Filed Oct. 23, 1957

INVENTORS:
Jerry Glaser
Emerson L. Kumm
Henry J. Roschak
Willis A. Stoner

By Smyth & Roston

Attorneys

Developed View

Oct. 18, 1960  J. GLASER ET AL  2,956,502
FUEL PUMP

Filed Oct. 23, 1957  5 Sheets-Sheet 4

INVENTORS
Jerry Glaser
Emerson L. Kumm
Henry J. Roschok
Willis A. Stoner

By Smyth & Roston
Attorneys

Oct. 18, 1960

J. GLASER ET AL 2,956,502

FUEL PUMP

Filed Oct. 23, 1957

INVENTORS:
Jerry Glaser
Emerson L. Kumm
Henry J. Roschak
Willis A. Stoner

By Smyth & Roston

Attorneys,

United States Patent Office 2,956,502
Patented Oct. 18, 1960

2,956,502

FUEL PUMP

Jerry Glaser, Los Angeles, Emerson L. Kumm, Encino, Henry J. Roschak, Sherman Oaks, and Willis A. Stoner, Long Beach, Calif., assignors, by mesne assignments, to Curtiss-Wright Corporation, a corporation of Delaware Filed Oct. 23, 1957, Ser. No. 691,968

7 Claims. (Cl. 103—87)

This invention relates to a pump for liquid fuel and the like and, more particularly, refers to a self-contained power pump unit to supply fuel to combustion means for driving an airborne vehicle. The invention is directed especially to the problem of providing such a unit for high Mach number applications, i.e., a unit for the fuel system of a supersonic airborne vehicle such as a supersonic aircraft or a supersonic missile.

A power pump unit for use on a supersonic device should be compact, highly reliable and of simple structure in the sense of having relatively few moving parts. The invention meets this general requirement by combining a fuel pump and a turbine that uses hot gases to operate the pump, the combination comprising essentially an elongated casing of generally cylindrical cross-sectional configuration and a unitary rotary assembly journaled in the casing.

The rotary assembly in the preferred embodiment of the invention comprises simply a shaft with two-stage pump impeller means on one end and with a turbine rotor on the other end for actuating the impeller means, the shaft being journaled in the casing by bearing means between the impeller means and the turbine rotor. The impeller means comprises an inducer stage and a centrifugal impeller stage, the inducer stage being a screw-type blade arrangement on the shaft. The unit also includes an annular nozzle for actuation of the turbine rotor and a volute for feeding the hot gases to this annular nozzle.

One of the requirements in the operation of such a pump unit is effective lubrication of the bearings for the rotary assembly. Since the liquid fuel itself may serve as the lubricant, the unit includes means to divert a portion of the liquid fuel to the shaft bearings. Any such fuel diversion arrangement, however, must take into consideration two problems. One problem is to avoid the diversion of lubricating liquid that is contaminated by solids. The other problem is to provide for adequate circulation of the lubricant through the bearings.

The first problem of avoiding the introduction of solids into the lubrication system arises from the fact that in a high Mach number application, the heat generated by the friction of the air on the external surface of the airborne vehicle inevitably raises the temperature of the fuel to a relatively high degree. The fuel temperature may be on the order of 500° F. and when a fuel of the general character of kerosene is heated to this extent a certain amount of "coking" or "gumming" occurs, solids and semi-solids being formed in the fuel.

The invention meets this problem by purging the solids from the fuel that is diverted for lubrication. In this regard a feature of the invention is the use for this purpose of the back of the centrifugal impeller of the pump. The diverted fuel is led radially inwardly along the back of the centrifugal impeller from a high pressure zone in the pump and the back of the impeller is provided with ribs or shallow blades to throw back the solids and semi-solids by centrifugal action and thus permit only clear fuel to be diverted for lubrication.

The second problem of circulating the fluid through the bearings exists because, although the liquid is diverted from a high pressure region in the pump, the pressure falls off as the liquid is forced through the narrow clearance spaces at the bearings. Consequently the liquid diverted for lubrication tends to stagnate at the bearings.

The invention meets this problem by building into the shaft a centrifugal impeller to boost the pressure of the lubricant that has passed through the bearings, the boost in pressure being sufficient to cause the diverted fuel to flow to a low pressure region in the pump near the pump inlet for recirculation through the pump. In this regard a feature of the preferred practice of the invention is that the pump shaft is formed with a circumferential enlargement for the dual purpose of providing the centrifugal booster and of cooperating with adjacent thrust bearings to hold the pump shaft against axial shift. The diverted lubrication fluid flows from the bearings to reach the interior of the shaft ultimately at greatly reduced pressure and then flows centrifugally outward to the periphery of the shaft enlargement with pressure boosting effect.

A further problem that arises in the operation of such a turbine-powered pump is that the hot gases make such a large pressure differential available for driving the turbine rotor that the rotor may reach a destructive speed when the fuel load is low. This problem is met by employing exhaust passage means on the discharge side of the rotor, the exhaust passage being substantially restricted for a choking action. The choking action of the exhaust passage creates substantial back pressure and thereby limits the pressure drop across the rotor to a magnitude that causes operation of the rotor and pump at only moderate speed when the pump load approaches zero.

The various features and advantages of the invention may be understood by reference to the following detailed description and the accompanying drawings.

In the drawings, which are to be regarded as merely illustrative:

Figure 1:
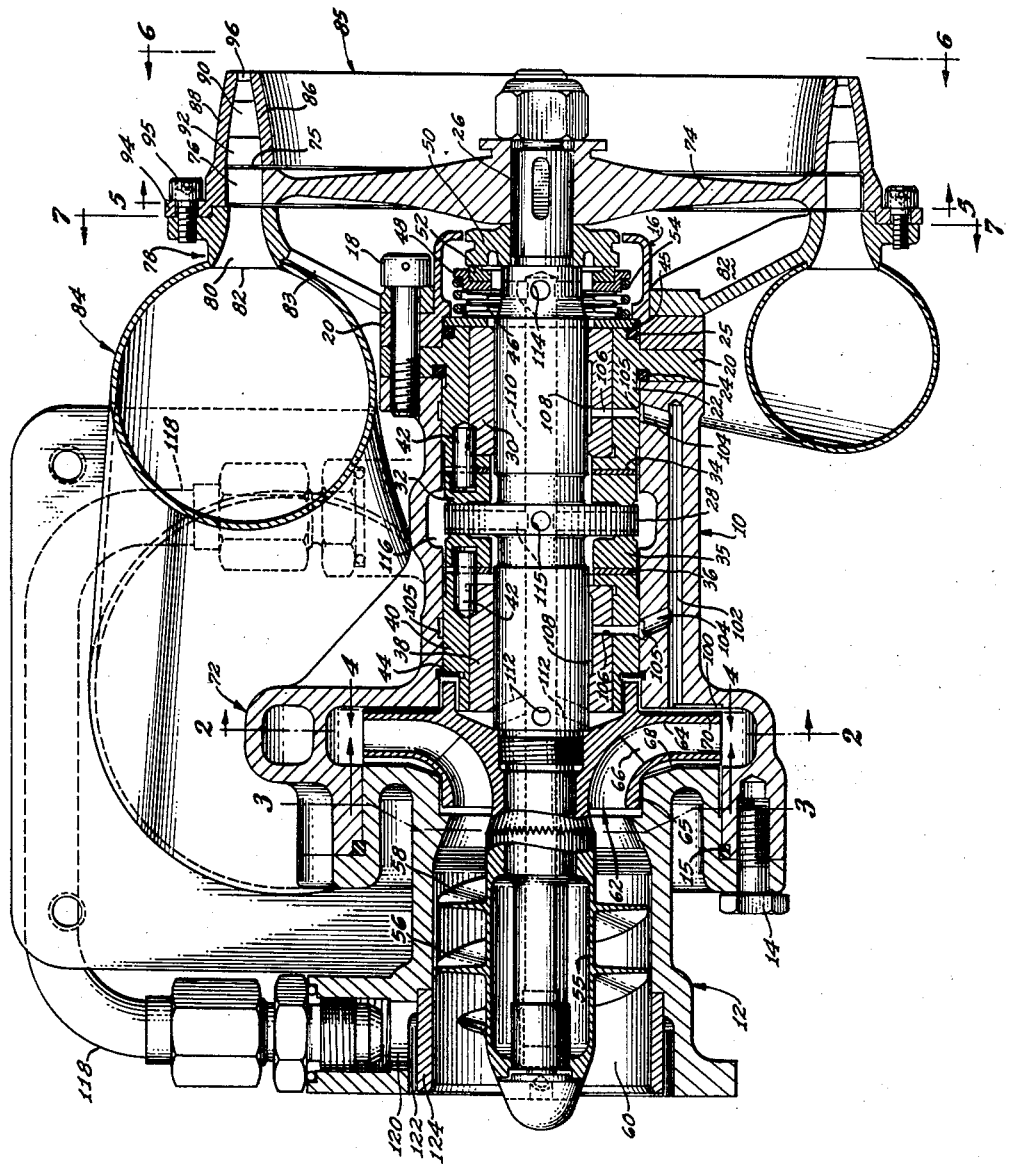
Fig. 1 is a longitudinal sectional view of the presently preferred embodiment of the invention.

The unit shown in Fig. 1 combining a pump with an actuating turbine has a housing comprising a main housing section 10 and an inlet housing section or cover 12. These two housing sections are interconnected by suitable screws 14, the joint being made fluid tight by a suitable sealing ring 15. A cup-shaped seal housing 16 is attached to the other end of the main housing section 10 by screws 18, which screws pass through an intervening radial flange 20 of a bearing sleeve 22. A suitable sealing ring 24 is employed at the joint between the bearing sleeve flange and the main housing section and a second sealing ring 25 is provided between the bearing sleeve flange and the seal housing.

The rotary assembly of the unit includes a shaft 26 having a central circumferential enlargement or integral collar 28. This shaft is journaled in the main housing section 10 by a bearing assembly which comprises: the flanged bearing sleeve 22; a carbon bearing 30 mounted inside the bearing sleeve; a carbon thrust bearing 32 in abutment against one face of the integral shaft collar 28; a spacer ring 34 between the thrust bearing and the bearing sleeve 22; a carbon thrust bearing 35 in abutment against the second face of the shaft collar 28; a second spacer ring 36; and a carbon bearing 38 in a second bearing sleeve 40. This bearing assembly is unified on opposite sides of the shaft collar 28 by dowels 42 and the bearing assembly is held against axial movement by the bearing sleeve flange 20 at one end in cooperation with a suitable retaining ring 44 at the other end.

The cup-shaped seal housing 16 encloses a sealing assembly having the following elements: a flat ring 45 in abutment against the sealing ring 25; a flexible cylindrical bellows 46 connecting the flat ring 45 with a flanged floating ring 48; a collar 50 fixedly mounted on the shaft 26 to rotate therewith; a carbon sealing ring 52 mounted in the floating ring 48 in pressure contact with the face of the collar 50; and a coiled spring 54 acting in compression between the flat ring 45 and the floating ring 48 to maintain the pressure at the carbon sealing ring 52. It is apparent that this sealing assembly will maintain its sealing effectiveness through a wide range of thermal expansion and contraction of the associated components.

The inducer stage of the pump comprises a cylindrical hub 55 on the end of the shaft 26 and at least one helical or screw type blade integral with the hub. In the construction shown there are two helical blades 56 and 58. The cylindrical hub 55 together with the surrounding housing section 12 forms an annular inlet passage 60 which is spanned radially by the helical blades 56 and 58.

Figure 2:
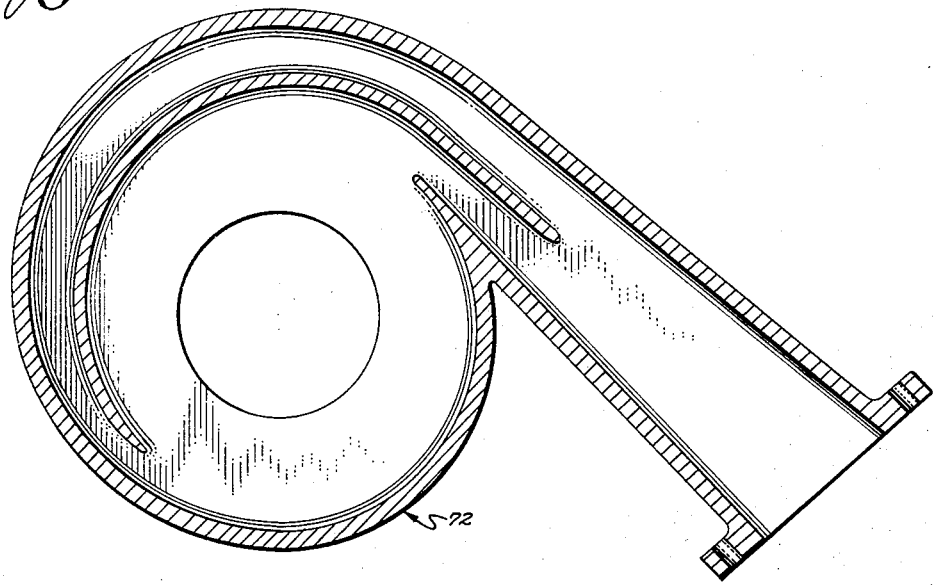
Fig. 2 is a transverse section taken as indicated by the line 2—2 of Fig. 1 and showing the construction of a double volute diffuser at the centrifugal impeller stage of the pump.
Figure 3:
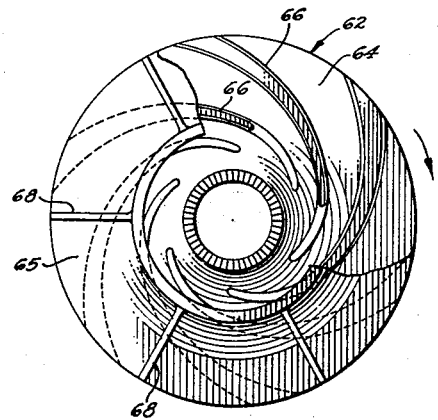
Fig. 3 is a front elevation of the centrifugal impeller as viewed along the line 3—3 of Fig. 1, a portion of the forward cone of the impeller being broken away.
Figure 4:
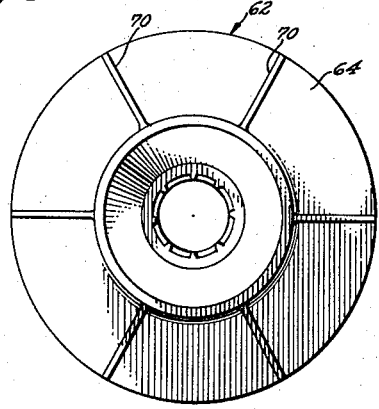
Fig. 4 is a rear elevation of the centrifugal impeller as viewed along the line 4—4 of Fig. 1.

Mounted on the shaft 26 adjacent the inducer stage is a centrifugal impeller, generally designated by numeral 62, that comprises a base cone 64 and a forward cone 65, these two cones being interconnected by integral blades 66 that form flow passages in communication with the inlet passage 60. As may be seen in Fig. 3, the blades 66 are swept back with respect to the direction of rotation. The forward face of the forward cone 65 is provided with integral radial ribs or shallow blades 58 and, as shown in Fig. 4, the back face of the base cone 64 is formed with similar radial ribs or shallow blades 70. These shallow blades 68 and 70 are sufficiently close to the adjacent surfaces of the surrounding housing to prevent any appreciable reverse flow around the outer surfaces of the centrifugal impeller and in addition are conducive to balancing of the pressure on the opposite sides of the impeller. The centrifugal impeller 62 discharges into a diffuser in the form of a double volute 72, the construction of which is shown in Fig. 2.

Figure 5:
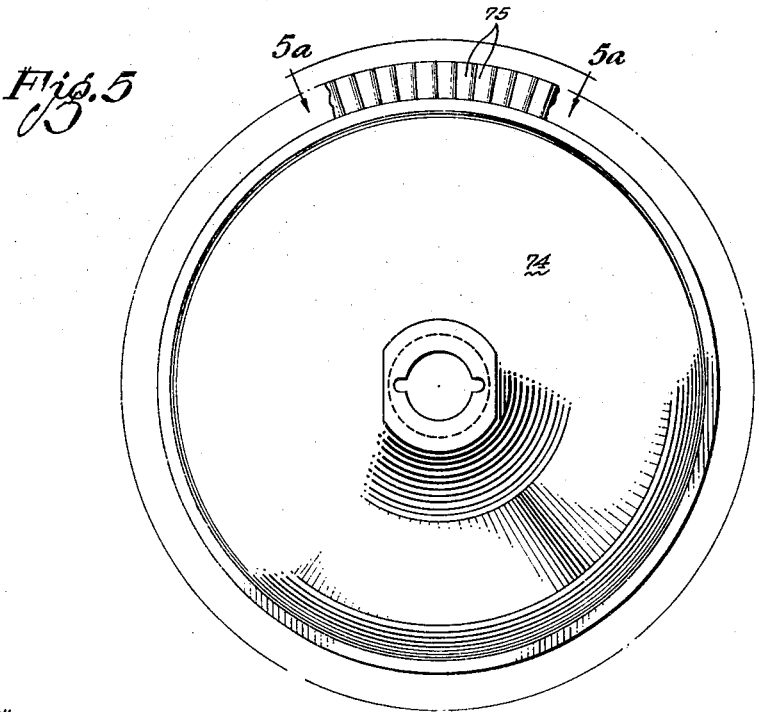
Fig. 5 is a front elevation of the turbine rotor as viewed along the line 5—5 of Fig. 1.
Figure 5A:
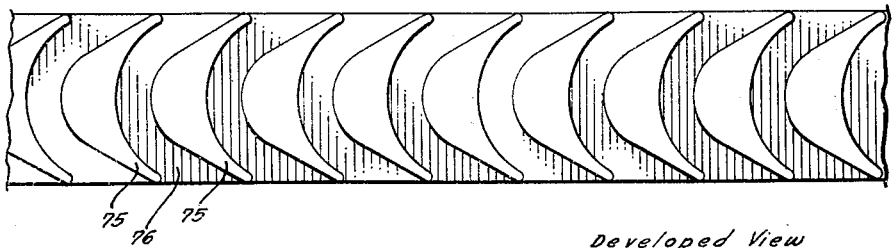
Fig. 5A is an enlarged developed view of the blades of the rotor as seen along the line 5a—5a of Fig. 5.

Mounted on the second end of the shaft 26 and secured thereto by a nut 73 is a turbine rotor 74, the construction of which is shown in Figs. 1, 5 and 5A. The turbine rotor 74 has radial peripheral blades 75 which form rotor passages 76 as best shown in Figure 5A, the opposite sides of the blades being swept back with respect to the direction of rotation.

Figure 7:
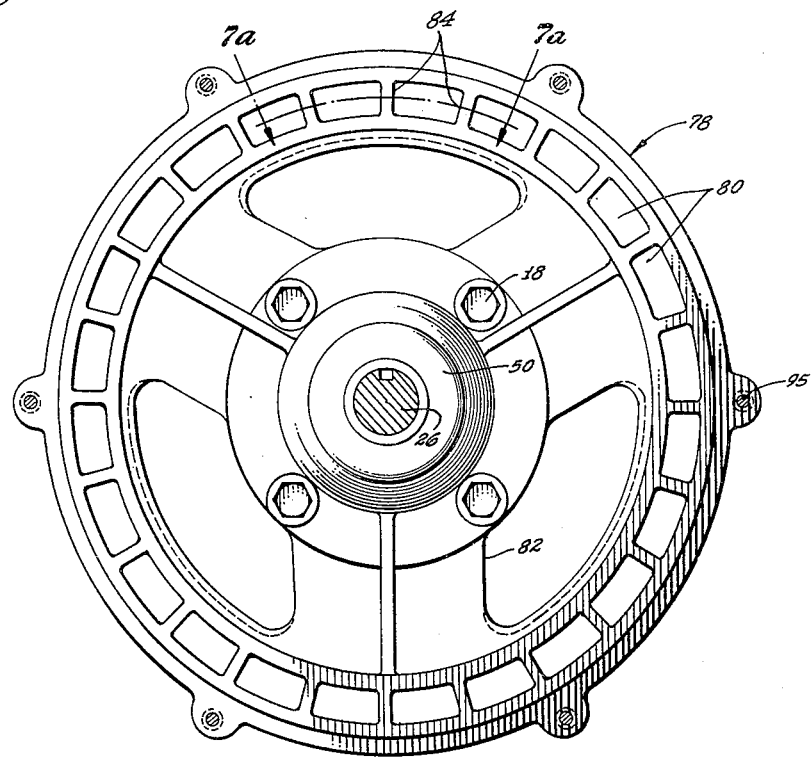
Fig. 7 is a transverse cross section of the annular turbine nozzle taken as indicated by the line 7—7 of Fig. 1.
Figure 7A:
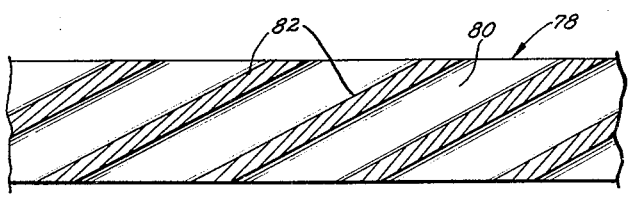
Fig. 7A is an enlarged developed view of the vanes of the turbine nozzle as seen in cross section along the line 7a—7a of Fig. 7.

Mounted adjacent the turbine rotor 74 is a nozzle passage structure, generally designated 78, which forms an annular nozzle passage 80 that registers with the rotor passages 76. The annular nozzle passage 80 is spanned by equally spaced guide vanes 82 that are suitably inclined in the desired direction of rotation of the rotor as indicated in Fig. 7A. The nozzle passage structure 78 has an integral spider 83 by means of which it is mounted on the unit housing, the spider being secured by the previously mentioned screws 18. The combustion gases for driving the turbine rotor 74 are supplied to the annular nozzle passage 80 by a corresponding volute 85 which may be mounted on and supported by the nozzle passage structure 80 as shown.

Figure 6:
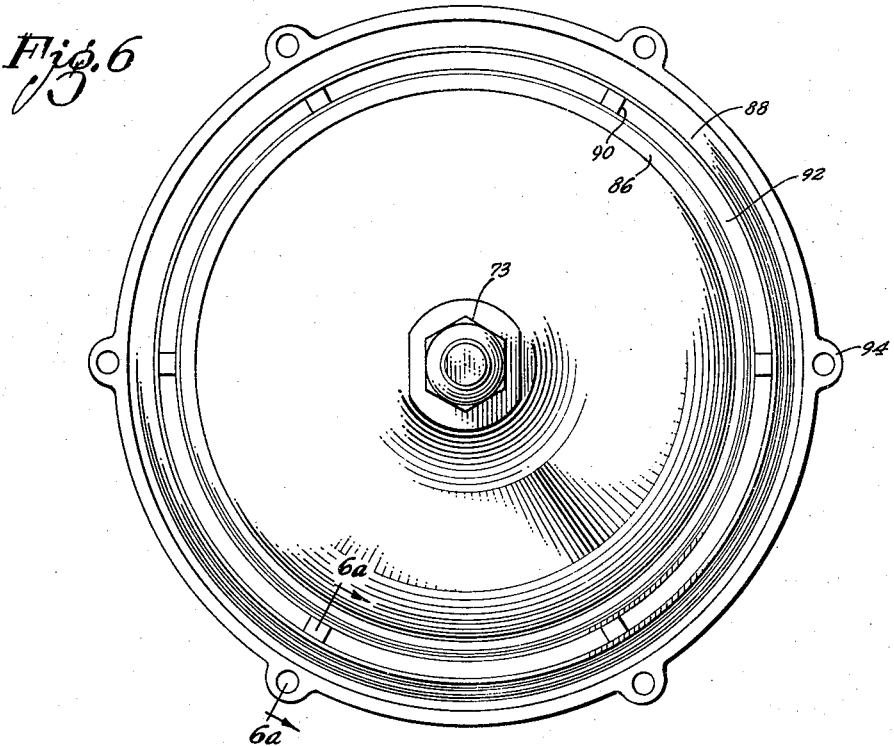
Fig. 6 is a rear elevation of the discharge passage structure of the turbine as viewed along the line 6—6 of Fig. 1.
Figure 6A:
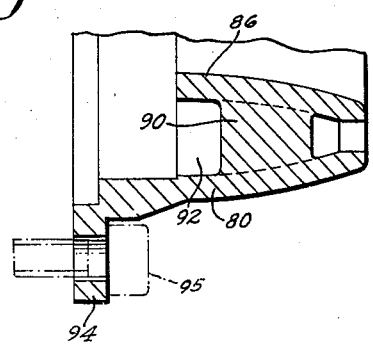
Fig. 6A is an enlarged fragmentary cross section taken as indicated by the line 6a—6a of Fig. 6 to show the construction of the discharge passage structure.

Adjacent the second side of the turbine rotor 74 is an exhaust passage structure, generally designated 85, the construction of which is shown in Figs. 1, 6 and 6A. The exhaust passage structure 85 comprises an inner circular wall 86 and an outer circular wall 88 interconnected by integral radial webs 90 and forming an annular exhaust passage 92. The outer circular wall 88 encloses the circumference of the turbine rotor 74 to confine the gaseous fluid and this outer circular wall is formed with a radial ear 94 to receive screws 95 by means of which the exhaust passage structure 85 is attached to the nozzle passage structure 78. It is important to note that the two circular walls 86 and 88 of the exhaust passage structure converge to a substantial degree to form a restriction 96 for choking action on the gaseous fluid. This choking action results in relatively high back pressure adjacent the turbine rotor 74 by virtue of which the pressure differential across the turbine rotor is held at a sufficiently low magnitude to prevent excessive overspeed on the part of the rotor when the load on the pump is relatively low.

In the present embodiment of the invention, the fluid passage arrangement to divert liquid fuel to the shaft bearings for the purpose of lubrication includes the following: a recess 100 in the inner wall of the housing section 10 extending radially inward adjacent the back face of the centrifugal impeller 62; a bore 102 extending longitudinally through the housing wall from the recess 100; a pair of spaced bores 104 extending inward from the longitudinal bore 102 to the interior of the housing adjacent the two bearing sleeves 22 and 40, respectively; corresponding inner circumferential grooves 105 in the housing surrounding the respective bearing sleeves; and radial bores 106 extending inward through the respective bearing sleeves 22 and 40 and the corresponding carbon bearings 30 and 38 to shallow recesses 108 on the inner circumferences of the two carbon bearings.

The fluid passage arrangement to return the diverted liquid fuel from the periphery of the shaft 26 to the pump for recycling through the pump includes the following: an axial bore 110 in the shaft 26; a plurality of bores 112 from the periphery of the shaft to the axial bore 110 at one end of the bearing assembly; a similar plurality of bores 114 from the periphery of the shaft to the axial bore 110 at the other end of the bearing assembly; a plurality of relatively long radial bores 115 for outward flow from the axial bore 110 to the periphery of the integral shaft collar 28; an annular chamber 116 formed by the housing section 10 around the shaft collar 28; an exterior conduit 118 for return flow from the annular chamber 118 to a return port 120 and an annular space 122 around a cylindrical insert 124 that places the return port 120 in communication with the inlet passage 160, the communication being around the forward edge of the cylindrical insert.

This passage system for deversion and recycling of a portion of the liquid fuel requires that the annular space that encloses the bearing assembly be sealed off from the exterior of the housing. The previously described sealing assembly in the cup-shaped seal housing 16 serves this purpose.

The diverted fuel flows to and through the bearing assembly to the periphery of the shaft because the recess 100 at the inlet end of the passage system communicates with the high pressure region of the pump adjacent the periphery of the centrifugal impeller 62. The pressure of the diverted fluid drops to a relatively low magnitude, however, by the time it reaches the axial bore 110 of the shaft, not only because the fluid flow of the center of the shaft is through restricted spaces but also because the radial bores 115 in the shaft collar 28 function as a centrifugal impeller to draw fluid from the axial shaft bore 110. The liquid is centrifugally discharged by the radial bores 115 into the surrounding annular chamber 116. By virtue of this arrangement, a substantial degree of pressure is reestablished in the annular chamber 116 to cause the diverted liquid to flow through the return conduit 118 back to the low pressure region in the pump inlet passage 60.

A highly important feature of this lubrication system is the manner in which the ribs or shallow blades 70 on the back face of the centrifugal impeller 62 cooperate with the radial recess 100 to eliminate solids and semi-solids from the diverted liquid. The radial recess 100 provides sufficient clearance adjacent the radial blades 70 to permit the required diversion flow from the high pressure region of the pump but fluid entering the recess 100 and flowing radially inward through the recess encounters the shallow radial blades 70 of the centrifugal impeller 62. The radial blades 70 act centrifugally on the solids and semi-solids of the diverted fluid to return the solids and semi-solids to the double volute 72. Thus the shallow radial blades 70 provide a dynamic screening action to keep solids and semi-solids out of the lubrication system.

Our description in specific detail of the presently preferred embodiment of the invention will suggest various changes, substitutions and other departures from our disclosure within the spirit and scope of the appended claims.

We claim:

1. A pump to supply liquid fuel to combustion means for driving a high speed airborne vehicle, comprising: a housing; a shaft journaled in said housing longitudinally thereof; rotary impeller means mounted on said shaft at one end of said housing to draw liquid fuel into the housing; diffuser means surrounding said impeller means to receive the liquid fuel therefrom; a turbine rotor on said shaft at the other end of said housing, said rotor having a circumferential series of blades; a volute in communication with said combustion means to receive gaseous fluid therefrom, said volute surrounding said housing between said diffuser means and said rotor; an annular nozzle between said rotor and said volute to receive gaseous fluid from the volute, said annular nozzle being adjacent one side of said series of blades; an exhaust passage structure forming an annular exhaust passage on the opposite side of said series of blades and cooperating with said annular nozzle and said rotor to confine the gaseous fluid, said annular exhaust passage being restricted to create substantial back pressure therein thereby reducing the pressure differential of the gaseous fluid across said series of blades to keep the speed of the rotor in moderate limits when the load on said rotary impeller means drops; and means to recycle a portion of the liquid fuel to lubricate said shaft, said recycling means including a passage for fluid flow from a high perssure region downstream from said rotary impeller means to the periphery of said shaft and from the periphery of the shaft to a low pressure region upstream from said rotary impeller means.

2. A pump to supply liquid fuel to combustion means for driving a high speed airborne vehicle, comprising: an elongated housing of generally cylindrical cross-sectional configuration; an actuating shaft extending through said housing axially thereof, one end of said housing forming an annular inlet passage around one end of said shaft; helical radial blade means on said shaft in said annular inlet passage to induce liquid flow into and through the annular inlet passage; a centrifugal impeller on said shaft at the inner end of said annular inlet passage; a diffuser surrounding said centrifugal impeller; bearing means journaling said shaft in said housing; means to recycle a portion of the liquid fuel to lubricate said bearing means, said recycling means including a passage for fluid flow from a high pressure region downstream from said impeller to said bearing means and from said bearing means to a low pressure region upstream from the impeller; an enlargement on said shaft to provide a second centrifugal impeller included in said recycling means, said passage of said recycling means including a passage in said shaft and said second centrifugal impeller including at least one passage in said shaft enlargement from said shaft passage to the periphery of the enlargement; a turbine rotor on said shaft, said rotor having a circumferential series of blades; a volute in communication with said combustion means to receive gaseous fluid therefrom, said volute surrounding said housing; an annular nozzle between said rotor and said volute to receive gaseous fluid from the volute, said annular nozzle being adjacent one side of said series of rotor blades; and an exhaust passage structure forming an annular exhaust passage on the opposite side of said series of blades and cooperating with said annular nozzle and said rotor to confine the gaseous fluid, said annular exhaust passage being restricted to create substantial back pressure therein thereby reducing the pressure differential of the gaseous fluid across said series of blades to keep the speed of the rotor in moderate bounds when the load on said first mentioned centrifugal impeller drops.

3. A pump to supply liquid fuel to combustion means for driving a high speed airborne vehicle, comprising: a housing with a pump passage therethrough; rotary impeller means to force the liquid fuel through said passage; a turbine rotor operatively connected to said impeller means for actuation thereof, said rotor having a circumferential series of blades, an annular nozzle in communication with said combustion means to receive gaseous fluid therefrom, said nozzle being adjacent one side of said series of blades; and an exhaust passage structure forming an annular exhaust passage on the opposite side of said series of blades and cooperating with said annular nozzle and said rotor to confine the gaseous fluid, said annular exhaust passage being restricted to create substantial back pressure thereby reducing the pressure differential of the gaseous fluid across the rotor to keep the speed of the rotor within moderate limits when the load on said rotary impeller means drops.

4. A pump to supply liquid fuel to combustion means for driving a high speed airborne vehicle, comprising: an elongated housing having a passage for fluid flow therethrough; a shaft journaled in said housing longitudinally thereof; rotary impeller means mounted on said shaft at one end of said housing to move liquid fuel through said passage; diffuser means surrounding said impeller means to receive the liquid fuel therefrom; a turbine rotor on said shaft at the other end of said housing, said rotor having a circumferential series of blades, a volute to receive gaseous fluid for driving said rotor, said volute surrounding said housing between said diffuser and said rotor; an annular nozzle between said rotor and said volute to receive the gaseous fluid from the volute, said nozzle being adjacent one side of said series of blades; and an exhaust passage structure forming an annular exhaust passage on the opposite side of said series of blades and cooperating with said annular nozzle and said rotor to confine the gaseous fluid, said annular exhaust passage being restricted to create substantial back pressure thereby reducing the pressure differential of the gaseous fluid across the rotor to keep the speed of the rotor within moderate limits when the load on said rotary impeller means drops.

5. In a pump having a housing with a pump passage therethrough and having a shaft journaled in said housing with an impeller on the shaft to force liquid through said passage, means to lubricate said shaft with said liquid, comprising: means cooperative with said housing to form a liquid-confining space around a longitudinal portion of said shaft adjacent said impeller; a circumferential enlargement on said shaft; bearing means in said space for said shaft, including thrust bearing means in abutment with said enlargement; a diversion passage from a high pressure region in said pump passage to said space to divert liquid from the pump passage for lubrication of said bearing means; and a return passage from said space to a low pressure region of said pump passage upstream from said high pressure region for recycling of the diverted liquid, said return passage extending from said space into the interior of said shaft and extending from the interior of the shaft outward through said enlargement for centrifugal pumping action on the diverted liquid.

6. In a pump having a housing with a pump passage therethrough and having a shaft journaled in said housing with an impeller on the shaft to force liquid through said passage, means to lubricate said shaft with said liquid, said lubricating means comprising: fluid passage means to divert a portion of said fluid from a high pressure region in said pump passage to the periphery of said shaft; a longitudinal passage in said shaft to collect the diverted liquid; at least one inwardly directed passage in said shaft from the periphery of the shaft to said longitudinal passage to convey the diverted liquid thereto; at least one outwardly directed passage in said shaft from said longitudinal passage to a zone at the periphery of the shaft, said outwardly directed passage being of greater radial extent than said inwardly directed passage for greater centrifugal effect on the liquid to pump the diverted liquid from said longitudinal passage to said zone, said zone being in communication with a low pressure region of said pump passage downstream from said high pressure region for recycling of the diverted liquid through said pump passage.

7. In a pump having a housing with a pump passage therethrough and having a shaft journaled in said housing with a centrifugal impeller on the shaft to force liquid through said passage, means to lubricate said shaft with said liquid, comprising: means cooperative with said housing to form a liquid-confining space around a longitudinal portion of said shaft adjacent said impeller; bearing means in said space for said shaft; a diversion passage formed in part by the back of said centrifugal impeller and extending radially inward along the impeller, said passage placing the high pressure region of said pump passage at the periphery of the centrifugal impeller in communication with said space for diversion of liquid from the pump passage thereto for lubrication of said bearing means, the back side of said centrifugal impeller at said diversion passage being formed with blades to engage solids in the diversion passage for centrifugal effect on the solids to return the solids to said high pressure region; and a return passage from said space to a low pressure region of said pump passage to return the diverted liquid thereto for recycling through the centrifugal impeller.

References Cited in the file of this patent
UNITED STATES PATENTS

| | | |
|---|---|---|
| 2,390,504 | Berger | Dec. 11, 1945 |
| 2,424,039 | Landesberg | July 15, 1947 |
| 2,469,439 | Lundquist | May 10, 1949 |
| 2,606,501 | Dreibelbis | Aug. 12, 1952 |
| 2,704,516 | Mock et al. | Mar. 22, 1955 |
| 2,768,584 | Nicol et al. | Oct. 30, 1956 |
| 2,778,312 | Suttle et al. | Jan. 22, 1957 |
| 2,814,928 | Davies et al. | Dec. 3, 1957 |